(12) United States Patent
Loman

(10) Patent No.: US 9,140,163 B2
(45) Date of Patent: Sep. 22, 2015

(54) ARRANGEMENT FOR INTRODUCING A LIQUID MEDIUM INTO EXHAUST GASES FROM A COMBUSTION ENGINE

(75) Inventor: Peter Loman, Sollentuna (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 13/816,756

(22) PCT Filed: Sep. 14, 2011

(86) PCT No.: PCT/SE2011/051106
§ 371 (c)(1),
(2), (4) Date: Feb. 26, 2013

(87) PCT Pub. No.: WO2012/044233
PCT Pub. Date: Apr. 5, 2012

(65) Prior Publication Data
US 2013/0152558 A1    Jun. 20, 2013

(30) Foreign Application Priority Data
Sep. 30, 2010   (SE) ...................................... 1051014

(51) Int. Cl.
F01N 3/02          (2006.01)
F01N 3/10          (2006.01)
(Continued)

(52) U.S. Cl.
CPC .............. *F01N 3/10* (2013.01); *B01F 3/04049* (2013.01); *B01F 5/045* (2013.01); *F01N 3/2066* (2013.01);
(Continued)

(58) Field of Classification Search
CPC ............... F01N 3/02; F01N 3/34; F01N 3/05; F01N 3/36; F01N 13/08; F01N 3/10; F01N 3/2066; F01N 3/24; F01N 13/141; F01N 2260/022; F01N 2610/02; F01N 2610/08; F01N 3/08; F01N 13/02; F01N 11/002; F01N 2240/20; F01N 2240/40; F01N 3/2892; B01F 5/045; B01F 3/04049; B01F 5/0498; B01D 2251/206; Y02T 10/24

USPC ....................................................... 60/272–324
See application file for complete search history.

(56) References Cited

U.S. PATENT DOCUMENTS

2010/0005790 A1    1/2010  Zhang ............................. 60/301
2010/0212292 A1*   8/2010  Rusch et al. .................... 60/274
(Continued)

FOREIGN PATENT DOCUMENTS

DE         42 03 807       8/1993
WO      WO 2009/012885     1/2009
WO      WO 2011/045347     4/2011

OTHER PUBLICATIONS

International Search Report mailed Jan. 10, 2012 in corresponding PCT International Application No. PCT/SE2011/051105.

*Primary Examiner* — Thomas Denion
*Assistant Examiner* — Kelsey Stanek
(74) *Attorney, Agent, or Firm* — Ostrolenk Faber LLP

(57) ABSTRACT

Arrangement for introducing a liquid medium into exhaust gases from a combustion engine: an injector for injecting the liquid medium into an injection chamber (3), a casing (8) which surrounds the injection chamber, a mixing duct (6), a gathering chamber (10) which surrounds the casing and is connected to the injection chamber via throughflow apertures of the casing, and a bypass duct (12) for leading exhaust gases into the mixing duct without passing through the gathering chamber and the injection chamber. The inlet (11) of the gathering chamber diverts a portion of the exhaust gases to flow into the gathering chamber, and then into the injection chamber via the throughflow apertures, and thereafter into the mixing duct, while the bypass duct leads another portion of the exhaust gases into the mixing duct in order to be mixed there with the diverted exhaust gases.

10 Claims, 1 Drawing Sheet

(51) Int. Cl.
  *F01N 3/20* (2006.01)
  *B01F 5/04* (2006.01)
  *B01F 3/04* (2006.01)
  *F01N 3/28* (2006.01)

(52) U.S. Cl.
  CPC ........... *F01N 3/2892* (2013.01); *F01N 2240/02* (2013.01); *F01N 2240/20* (2013.01); *F01N 2610/02* (2013.01); *F01N 2610/08* (2013.01); *F01N 2610/1453* (2013.01); *Y02T 10/24* (2013.01)

(56) References Cited

U.S. PATENT DOCUMENTS

2011/0094206 A1* 4/2011 Liu et al. .................... 60/274
2011/0308234 A1* 12/2011 De Rudder et al. ............. 60/295

* cited by examiner

ARRANGEMENT FOR INTRODUCING A LIQUID MEDIUM INTO EXHAUST GASES FROM A COMBUSTION ENGINE

CROSS-REFERENCE TO RELATED APPLICATIONS

The present application is a 35 U.S.C. §§371 national phase conversion of PCT/SE2011/051106, filed Sep. 14, 2011, which claims priority of Swedish Application No. 1051014-7, filed Sep. 30, 2010, the contents of which are incorporated by reference herein. The PCT International Application was published in the English language.

FIELD OF THE INVENTION, AND BACKGROUND OF THE INVENTION

The present invention relates to an arrangement for introducing a liquid medium, e.g. urea, into exhaust gases from a combustion engine To meet prevailing exhaust cleaning requirements, today's motor vehicles are usually provided with a catalyst in the exhaust line to effect catalytic conversion of environmentally hazardous constituents of the exhaust gases to environmentally less hazardous substances. A method which has been employed for achieving effective catalytic conversion is based on injecting a reducing agent into the exhaust gases upstream of the catalyst. A reductive substance which forms part of, or is formed by, the reducing agent is carried by the exhaust gases into the catalyst and is adsorbed on active seats in the catalyst, resulting in accumulation of the reductive substance in the catalyst. The accumulated reductive substance may then react with and thereby convert an exhaust substance to a non-hazardous substance. Such a reduction catalyst may for example be of SCR (selective catalytic reduction) type. This type of catalyst is hereinafter called an SCR catalyst. An SCR catalyst reduces NOx in the exhaust gases. In the case of an SCR catalyst, a reducing agent in the form of urea solution is usually injected into the exhaust gases upstream of the catalyst. The injection of urea into the exhaust gases results in the formation of ammonia which then serves as the reductive substance which assists the catalytic conversion in the SCR catalyst. The ammonia accumulates in the catalyst by being adsorbed on active seats in the catalyst, and NOx present in the exhaust gases is converted to nitrogen gas and water when it is brought into contact in the catalyst with accumulated ammonia on the active seats in the catalyst.

When urea is used as reducing agent, it is injected into the exhaust line in the form of a liquid urea solution via an injection means. The injection means comprises a nozzle via which the urea solution is injected under pressure into the injection means in the form of a finely divided spray. In many operating states of a diesel engine the exhaust gases will be at a high enough temperature to be able to vaporise the urea solution so that ammonia is formed. It is difficult, however, to avoid part of the urea solution supplied coming into contact with and becoming attached to the internal wall surface of the exhaust line in an unvaporised state. The exhaust line, which is often in contact with and cooled by surrounding air, will be at a lower temperature than the exhaust gases within the exhaust line. When a combustion engine is run in a uniform way for a period of time, i.e. in steady-state operating conditions, no appreciable variations in the exhaust flow occur and the urea solution injected into the exhaust gases will therefore encounter substantially the same region of the exhaust line throughout said period of time. The relatively cool urea solution may cause local lowering of the temperature in that region of the exhaust line, which may lead to the formation in that region of a film of urea solution which is then entrained by the exhaust flow. When this film has moved a certain distance in the exhaust line, the water in the urea solution will boil away under the influence of the hot exhaust gases. Solid urea will remain and be slowly vaporised by the heat in the exhaust line. If the supply of solid urea is greater than the vaporisation, solid urea will accumulate in the exhaust line. If the resulting layer of urea becomes thick enough, the urea and its decomposition products will react with one another to form urea-based primitive polymers known as urea lumps. Such urea lumps may over time block an exhaust line.

It is therefore desirable that the injected urea solution be spread well out in the exhaust gases so that it is prevented from encountering substantially the same region of the exhaust line. A good spread of the urea solution in the exhaust gases also facilitates its vaporisation.

In a known arrangement from WO 2009/012885, an injection means is adapted to injecting a liquid medium into a space within a tubular casing, thereby bringing the injected medium into contact with exhaust gases which flow into said space via throughflow apertures which are distributed round the circumference of the casing. The mixture of exhaust gases and injected medium thus formed within the casing is led thence into a mixing duct. Exhaust gases are also caused to flow into the mixing duct via apertures distributed round the forward end of the casing in order thereby to create along the wall of the mixing duct an exhaust flow which hinders the injected medium from coming into contact with said wall.

OBJECT OF THE INVENTION

The object of the present invention is to propose a further development of an arrangement of the type described above in order to achieve an arrangement with a configuration which in at least some aspects affords an advantage compared therewith.

SUMMARY OF THE INVENTION

The arrangement according to the invention comprises:
a line intended to have exhaust gases flowing through it,
an injection chamber with an open forward end,
an injection means for injecting the liquid medium into the injection chamber,
a casing which delineates the injection chamber in radial directions and is provided with throughflow apertures distributed round the circumference of the casing,
a mixing duct which forms part of the line and in which the injected liquid medium is intended to be vaporised and to which the injection chamber is connected via its open forward end,
a gathering chamber which is situated upstream of the injection chamber, surrounds at least part of said casing, has an inlet to receive exhaust gases and is connected to the injection chamber via said throughflow apertures of the casing in order to allow the exhaust gases received in the gathering chamber to enter the injection chamber via these apertures, and
a bypass duct for leading exhaust gases into the mixing duct without passing through the gathering chamber and the injection chamber.

The inlet of the gathering chamber is adapted to diverting a portion of the exhaust gases flowing through the line, in order to cause these diverted exhaust gases to flow into the gathering chamber, thence into the injection chamber via said throughflow apertures and thereafter into the mixing duct via the open forward end of the injection chamber, while the bypass duct is adapted to leading another portion of the exhaust gases flowing through the line into the mixing duct in order to be mixed there with said diverted exhaust gases.

Diverting only a portion of the exhaust flow to the gathering chamber in order to pass through the throughflow apertures of the casing makes it possible for said apertures to be dimensioned to apply a constriction to that portion of the exhaust flow without appreciably affecting the pressure of the portion of the exhaust flow which is led directly into the mixing duct via the bypass duct without passing through the gathering chamber and the injection chamber. The pressure increase built up by the exhaust gases in the gathering chamber will therefore make only a limited contribution to the total backpressure of the exhaust gases in the exhaust line. Applying a pressure increase to the exhaust gases which accumulate in the gathering chamber makes it possible for the flow of exhaust gases into the injection chamber to be caused to become substantially evenly distributed among the various throughflow apertures. Uniform distribution of these apertures in the circumferential direction of the casing thus makes it possible to achieve an inflow of exhaust gases into the injection chamber in a manner substantially symmetrical about the centreline of the injection chamber. It thus becomes possible to drive the finely divided medium towards the centre of the injection chamber so that it is prevented from encountering the wall surfaces of the injection chamber and the wall surfaces of the mixing duct in the region nearest to the injection chamber. The result is that the small drops of the liquid medium are spread well out in the exhaust gases in the mixing duct before having an opportunity to encounter any wall surface thereof, thereby eliminating or at least substantially reducing the risk of lump formation such as described above.

According to an embodiment of the invention, the inlet of the gathering chamber is dimensioned to divert to the gathering chamber 10-20% of the exhaust gases flowing through the line. This means that the exhaust flow diverted to the gathering chamber will be relatively small compared with the main flow which is led directly into the mixing duct via the bypass duct. The pressure increase which builds up in the exhaust gases in the gathering chamber will therefore make only a very small contribution to the total backpressure of the exhaust gases in the exhaust line. It is generally desirable to keep the total backpressure in the exhaust line as low as possible, since higher backpressure entails more fuel consumption.

Another advantage of diverting only a small portion of the total exhaust flow to the gathering chamber is that the exhaust flow into the gathering chamber will vary to only a limited extent when there are variations in the total exhaust flow. This means that the exhaust gases led into the injection chamber via the throughflow apertures of the casing will have a substantially similar effect on the injected liquid medium in different operating conditions and that the desired effect on the injected liquid medium is thus achievable in widely varying operating conditions.

According to another embodiment of the invention, the bypass duct surrounds the gathering chamber and is demarcated from it by a cowl situated between the gathering chamber and the bypass duct. This makes possible a compact and space-saving configuration of the arrangement.

Other advantageous features of the arrangement according to the invention are indicated by the dependent claims and the description set out below.

BRIEF DESCRIPTION OF THE DRAWING

The invention is described below in more detail on the basis of embodiment examples with reference to the attached drawing, in which.

DETAILED DESCRIPTION OF EMBODIMENTS OF THE INVENTION

Figure 1:
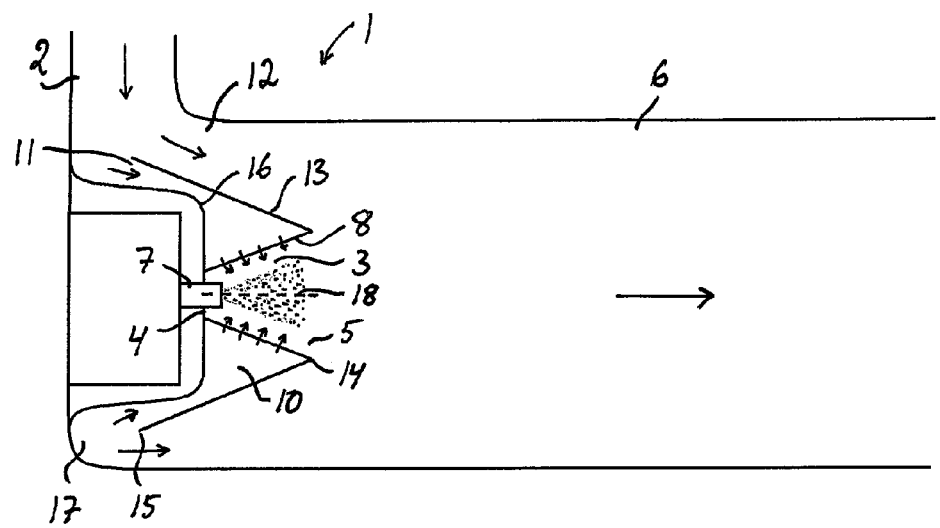
FIG. 1 is a schematic longitudinal section through an arrangement according to an embodiment of the present invention.

FIG. 1 illustrates an arrangement 1 according to the present invention for introducing a liquid medium into exhaust gases from a combustion engine. The arrangement may for example be situated in an exhaust line upstream of an SCR catalyst in order to introduce a liquid reducing agent in the form of urea or ammonia into the exhaust line upstream of the SCR catalyst, or be situated in an exhaust post-treatment device in order to introduce a liquid reducing agent in the form of urea or ammonia upstream of an SCR catalyst which forms part of the exhaust post-treatment device.

The arrangement 1 comprises a line 2 intended to receive exhaust gases from a combustion engine and to lead them towards an exhaust post-treatment unit, e.g. in the form of an SCR catalyst. The arrangement 1 further comprises an injection chamber 3 with a closed rear end 4 and an open forward end 5. The injection chamber 3 is connected via its open forward end 5 to a mixing duct 6 which forms part of the line 2 and which is situated downstream of the injection chamber 3. An injection means 7 for injecting the liquid medium is situated at the centre of the rear end 4 of the injection chamber to inject the liquid medium towards the open forward end 5 of the injection chamber. In the example illustrated, the injection means 7 extends into the injection chamber 3 via the latter's rear end 4. The injection means 7, which may for example comprise an injection nozzle, is adapted to injecting the liquid medium under pressure into the injection chamber 3 in the form of a finely divided spray.

Figure 2:
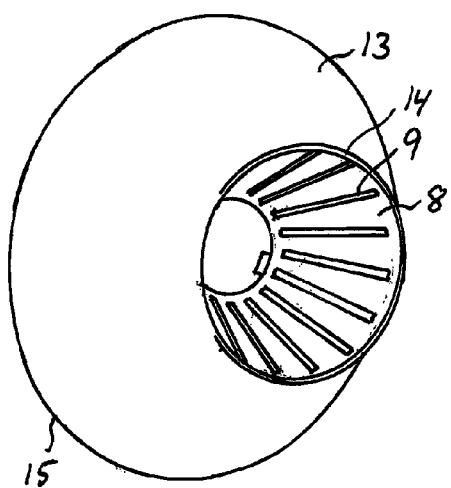
FIG. 2 is a schematic perspective view of parts of the arrangement according to FIG. 1.

The injection chamber 3 is demarcated radially by a casing 8 which extends between the rear end 4 and open forward end 5 of the injection chamber. This casing 8 is provided with throughflow apertures 9 (see FIG. 2) which are distributed in the circumferential direction of the casing. The throughflow apertures 9 are distributed symmetrically about the centreline 18 of the casing. Each aperture 9 may for example take the form of a slit extending in the axial direction of the casing, as illustrated in FIG. 2. The apertures 9 might however also have other alternative shapes. In the embodiment illustrated, the casing 8 takes the form of a truncated cone which broadens from the rear end 4 towards the open forward end 5 of the injection chamber.

A gathering chamber 10 is situated upstream of the injection chamber 3. This gathering chamber 10 surrounds at least part of the casing 8. In the embodiment illustrated in FIG. 1, the gathering chamber 10 surrounds the whole of the casing 8. The gathering chamber 10 has an inlet 11 to receive exhaust gases from the line 2 and is connected to the injection chamber 3 via throughflow apertures 9 of the casing in order to allow exhaust gases received in the gathering chamber 10 to enter the injection chamber 3 via these apertures 9. The combined cross-sectional area of the apertures 9 of the casing is with advantage smaller than the cross-sectional area of the inlet 11 of the gathering chamber so that the exhaust gases diverted to the gathering chamber 10 undergo a pressure increase in the gathering chamber.

A bypass duct 12 is situated in the line 2 upstream of the mixing duct 6 in order to lead exhaust gases into the mixing duct without passing through the gathering chamber 10 and the injection chamber 3. The bypass duct 12 surrounds the gathering chamber 10 and is demarcated from it by a cowl 13 situated between the gathering chamber and the bypass duct. In the embodiment illustrated the cowl 13 takes the form of a truncated cone which broadens from its forward end 14 upstream towards its rear end 15. The bypass duct 12 surrounds, and extends along the outside of, the cowl 13. In the embodiment illustrated, the forward end 14 of the cowl 13 is connected to the forward end of the casing 8.

The inlet 11 of the gathering chamber is adapted to diverting a portion of the exhaust gases flowing through the line 2 in order to cause these diverted exhaust gases to flow into the gathering chamber 10, thence into the injection chamber 3 via the throughflow apertures 9 of the casing 8 and thereafter into the mixing duct 6 via the open forward end 5 of the injection chamber, while the bypass duct 12 is adapted to leading another portion of the exhaust gases flowing through the line 2 directly into the mixing duct 6 in order to be mixed there with said diverted exhaust gases. The spray of liquid medium injected into the injection chamber 3 via the injection means 7 comes into contact in the injection chamber 3 with exhaust gases which flow into the injection chamber via the apertures 9 of the casing in a substantially symmetrical flow about said spray. The exhaust gases flowing into the injection chamber 3 prevent the liquid medium in said spray from coming into contact with the inside of the casing 8, and carry the liquid medium with them into the mixing duct 6, in which the liquid medium is spread out in the exhaust gases and is vaporised by their heat.

The inlet 11 of the gathering chamber 10 is with advantage dimensioned to divert to the gathering chamber 5-50%, preferably 10-20%, of the exhaust gases flowing through the line 2.

In the embodiment illustrated in FIG. 1, the arrangement 1 comprises a bulging portion 16 which extends into the line 2 and has the casing 8 protruding from its upper side. The gathering chamber 10 is formed between this bulging portion 16, the casing 8 and the cowl 13. The inlet 11 of the gathering chamber is in this case annular and extends round the bulging portion 16. Upstream of the inlet 11 of the gathering chamber, the line 2 has an annular space 17 which extends round the bulging portion 16.

The arrangement according to the invention is particularly intended for use in a heavy motor vehicle, e.g. a bus, a tractor unit or a truck.

The invention is of course in no way restricted to the embodiments described above, since various possibilities for modifications thereof are likely to be obvious to a specialist in the field without thereby having to deviate from the basic concept of the invention such as defined in the attached claims.

The invention claimed is:

1. An arrangement for introducing a liquid medium into exhaust gases from a combustion engine, the arrangement comprising:

a line configured for exhaust gases to flow through the line;

an injection chamber having a closed rear end and an open forward end;

an injector configured for injecting the liquid medium into the injection chamber, the injector extending into the injection chamber;

a casing which demarcates the injection chamber in radial directions and is provided with throughflow apertures distributed around the circumference of the casing;

a bulging portion which extends into the line and which has the casing protruding from its upper side, the upper side of the bulging portion forming a first portion of the closed rear end of the injection chamber, a portion of the injector projecting above the upper side of the bulging portion into the injection chamber forming a second portion of the closed rear end of the injection chamber, the closed rear end surrounding the injector;

a mixing duct which forms part of the line and to which the injection chamber is connected via its open forward end;

a gathering chamber which is situated upstream of the injection chamber, surrounds at least part of the casing, has an inlet to receive exhaust gases, and is connected to the injection chamber via the apertures of the casing in order to allow the exhaust gases received in the gathering chamber to enter the injection chamber via these apertures; and a bypass duct which is situated in the line upstream of the mixing duct in order to lead exhaust gases into the mixing duct without passing through the gathering chamber and the injection chamber; wherein the inlet of the gathering chamber is configured for diverting a portion of the exhaust gases flowing through the line, in order to cause these diverted exhaust gases to flow into the gathering chamber, and then into the injection chamber via the apertures and thereafter into the mixing duct via the open forward end of the injection chamber, while the bypass duct is configured for leading another portion of the exhaust gases flowing through the line into the mixing duct in order to be mixed there with the diverted exhaust gases; and the combined cross-sectional area of the apertures of the casing is smaller than the cross-sectional area of the inlet of the gathering chamber so that the exhaust gases diverted to the gathering chamber are subject to a pressure increase in the gathering chamber.

2. The arrangement according to claim 1, wherein the inlet of the gathering chamber is dimensioned to divert to the gathering chamber 5-50% of the exhaust gases flowing through the line.

3. The arrangement according to claim 1, wherein the inlet of the gathering chamber is dimensioned to divert to the gathering chamber 10-20% of the exhaust gases flowing through the line.

4. The arrangement according to claim 1, wherein the casing is a truncated cone which broadens from a rear end of the injection chamber towards the open forward end of the injection chamber.

5. The arrangement according to claim 1, wherein the throughflow apertures of the casing are distributed symmetrically about its centreline.

6. The arrangement according to claim 1, wherein the injector is situated at the centre of a rear end of the injection chamber and is configured for injecting the liquid medium towards the open forward end of the injection chamber.

7. The arrangement according to claim 1, wherein the bypass duct surrounds the gathering chamber and is demarcated from it by a cowl which is situated between the gathering chamber and the bypass duct.

8. The arrangement according to claim 7, wherein the gathering chamber is formed between the bulging portion, the casing, and the cowl which surrounds the casing.

9. The arrangement according to claim 8, wherein the inlet of the gathering chamber is annular and extends around the bulging portion.

10. The arrangement according to claim 7, wherein the cowl is a truncated cone which broadens from its forward end upstream towards its rear end.

* * * * *